No. 856,353. PATENTED JUNE 11, 1907.
C. C. MARTIN & W. D. JONES.
PROCESS FOR RENOVATING AND REFINING BUTTER.
APPLICATION FILED AUG. 27, 1906.
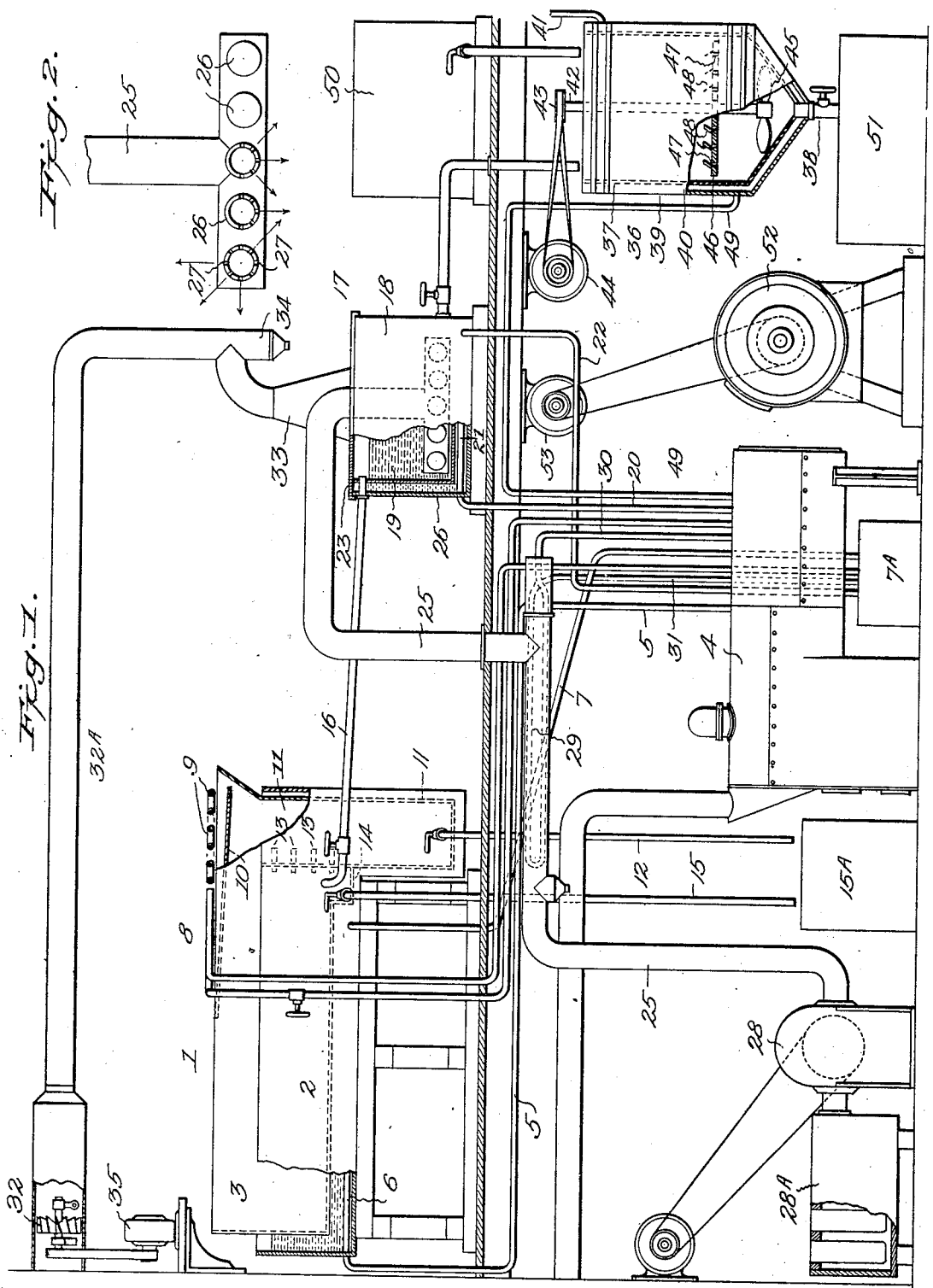
Witnesses:
G. Sargent Elliott.
Adella M. Fowle
Inventors:
Charles C. Martin
William D. Jones
By H. S. Bailey. Attorney.

UNITED STATES PATENT OFFICE.

CHARLES C. MARTIN AND WILLIAM D. JONES, OF DENVER, COLORADO; SAID JONES ASSIGNOR TO SAID MARTIN.

PROCESS FOR RENOVATING AND REFINING BUTTER.

No. 856,353.   Specification of Letters Patent.   Patented June 11, 1907.

Application filed August 27, 1906. Serial No. 332,263.

*To all whom it may concern:*

Be it known that we, CHARLES C. MARTIN and WILLIAM D. JONES, citizens of the United States of America, residing at the city and county of Denver and State of Colorado, have invented a new and useful Process for Renovating and Refining Butter, of which the following is a specification.

Our invention relates to improvements in processes for renovating and refining butter, oils, lard, and fat, and the objects of our invention are: First, to provide a process for butter and other naturally solid fatty products, but which is especially adapted for butter, and that will eliminate the curds, most of the moisture, impurities, fungus, and other germ life, and that will leave the butter or other material thoroughly renovated, practically dry, and refined. Second, to provide means for melting and separating the curds from stale, rancid, and impure butter, and butter with foreign taste, and for percolating the oil of the butter after it has been melted and the curds have been removed from it, with hot air of a temperature of from about 100 to about 200 degrees Fahrenheit, to eliminate the greater portion of the moisture, and to eliminate the foreign taste, and impurities contained therein, such as fungus and other germ life, and to reduce it to a dry and pure sweet butter oil, and then to subject it to an emulsifying and to a congealing and to a reworking treatment. Third, to provide a butter purifying and refining process, that will thoroughly purify, sweeten, and make a butter that is pure and that will be less susceptible to impurities or contamination than commercial machinery-made creamery butter. Fourth, to provide a process by which creamery-made butter may be refined or purified, and by removing the fungus or other objectionable germ life make it more wholesome and lasting in quality. Fifth, to provide a process in which the butter oil is aerated by thousands of needle-like jets of hot air, applied under pressure enough and in such a manner that the hot air percolates through the butter oil in small penetrating, independent hot air jets, that exert a separating, and comminuting action on the semi-liquid, and the albuminous, mucilaginous substances, and that are given sufficient pressure to keep the butter oil in a state of ebullition or violent boiling action. Sixth, to provide a process in which the butter oil after being aerated and purified by the percolation through it of hot air under pressure enough to keep it in a state of ebullition or violent boiling condition, is subjected to a mechanical emulsifier treatment in which the butter commingles with milk without the presence or introduction to the butter and milk of either hot or cold air. Seventh, to provide a new and improved hot oxygen percolating and agitating process for renovating, purifying, refining, and eliminating the moisture, fungus, growth, germ life, impurities of all kinds from melted butter oil.

Our process contemplates the use of any suitable apparatus which may be practically, economically, and successfully operated, but during the development and practical operation of our process we have designed an apparatus which is new in its main features, and we preferably illustrate this apparatus in the accompanying drawings.

In this apparatus: Figure 1, is a diagrammatic view of the apparatus we employ in the practical operation of our process. And Fig. 2, is a detail view partly in section, of one of the air conveying coils located within the refiner.

While our process is adapted to the renovating and refining of oils, lard, and fat, it has been especially designed for renovating and refining butter, and we will describe it for renovating and refining butter only.

Our process consists of a series of steps, which are as follows: The butter is first melted by applying heat to it, to a fluid state in any suitable tank, receptacle, or vessel, and while in this melted state the grosser impurities, such as curds and any foreign matter of a heavier specific gravity than the butter oil will settle out of it to the bottom of the tank, receptacle, or vessel, and the butter oil, free from these elements, is drawn off and is ready for the next step in the process. In practice we preferably carry out this step of our process in the following manner: We melt the butter in a machine having a large butter oil holding capacity, and preferably use a tank holding preferably about thirty-six hundred pounds of butter oil, and we have especially invented a machine 1, for this purpose, which we term the melter and curd separator, and which consists of two tanks 2 and 3, one being placed within the other. The outer tank 2, is provided with a body of hot water, which is kept heated by any suitable means; preferably a steam boiler 4 is used, from which a pipe 5 extends to the tank, and is connected to a coil of pipes 6, within the outer tank, and a return pipe 7 extends from the coil to an exhaust receptacle 7A at the boiler. The tank 3, rests inside of the tank 2, and extends above it, and its lower portion is surrounded by the water in the outer tank, and at the rear end of the tank 3, a heated platform 8, is placed, on which the butter in masses is placed, the practice being to take barrels, kegs, or boxes of butter, which are the ways it is generally shipped, and knock the barrels or kegs or boxes to pieces, and hoist the mass of butter on the platform, which is heated by any suitable means. This platform however, preferably consists of coils of pipe 9, connected to a supply of steam. Below the heated platform, a trough 10 is placed, and the melted butter runs down the trough into a depending compartment 11, formed at one end of both tanks, which is lower than the body of the tanks, and the curds in the butter oil settle into this depending portion of the tank 3, in the bottom of which a valve discharge pipe 12, is placed, and the butter oil is thus separated from the curds and it flows through apertures which are arranged in a vertical row, and are provided with removable plugs 13, that are adapted to be removed and the apertures opened and closed by an operator to suit the height of the melted butter oil in the curd settling compartment, and in the body of the tank 3 another curd settling compartment 14 is formed, which is provided with a valve-controlled discharge pipe 15. This curd compartment is adapted to catch any curds escaping with the butter oil into the body of the tank from the compartment 11, and the two discharge pipes 12 and 15 lead to a curd receiving receptacle 15A. This melted butter oil is kept heated by the hot water of the lower tank, in order to hold it in a fluid form at all times while there is butter oil in the tank. The butter oil is then conveyed by a suitable pipe or conveyer 16, to a machine, comprising a double receptacle, tank, or vessel 17, which we term the pneumatic percolator and refiner, which is made of such an area that the butter oil will be confined in a body of shallow depth, and in this tank we subject the butter oil for a period of time of from about three to five hours, to a continuous boiling action, which we impart to it by percolating substantially evenly throughout its area thousands of needle-like jets of hot air under sufficient pressure to have a lifting effect on the butter oil, and of sufficient pressure to exert a separating, and comminuting effect on some of the semisolid, mucilaginous, albuminous, sticky, and other natural or any foreign substance that may be present in the butter that is under renovating and refining treatment. The amount of time required to treat a charge of butter oil in this pneumatic percolating refiner, depends on the quality of the butter being renovated and refined. This pneumatic percolating and refining machine consists of two tanks 18 and 19, one within the other. The inner tank 19, may be of any desired capacity, but in practice we preferably make it to hold charges of about twelve to fifteen hundred pounds of butter oil; consequently the contents of the butter melting and curd separating machine is emptied into it when a charge of this weight has been melted in the melting and separating machine, and the inner tank 19 is made of an area that will permit this charge of butter oil to stand in it at a shallow depth, preferably a depth of a few inches, the depth depending on the pressure of the hot air, but we have found in practice that we obtain the best possible results with a pressure of from about eight to sixteen ounces of hot air per square inch, and with a depth of about ten to twelve inches of butter oil, and we heat the air to a temperature of from about one hundred to two hundred degrees Fahrenheit, and we discharge preferably about ten hundred to twelve hundred cubic feet of hot air into this depth and volume of butter oil per minute.

The inside tank 19, sits within the outside tank 18, and the outside tank 18 is heated by any suitable means, preferably by being filled with water, which is heated by a steam pipe 20, extending from the boiler 4, to a steam pipe 21, located within the outer tank, from which an exhaust pipe 22 extends. This hot water is used to keep the butter oil at a proper melted liquid state, when for any reason the hot air has been shut off. The inner tank is a closed tank, and is provided with a suitable cover 23, which is preferably positioned at the ends of the tank. The percolating air jets are introduced into the tank through an air conveying pipe 25, which extends into the tank and is arranged along its bottom in the form of coils 26, which are arranged to practically cover the bottom of the tank, and are provided with a very large number of small apertures 27, which are placed close together along the pipe and are arranged in the pipes of the coils to discharge the air jets in all directions if desired, but preferably downwardly, so as to discharge close to or against the bottom of the tank, although if desired they can be placed at any angle. In practice we use in the coils of a tank capable of holding about twelve to fifteen hundred pounds of butter oil, three thousand of these air jet perforations, and arrange them and the coils so that these jets of air are discharged close together into the butter oil, and substantially evenly throughout the tank's area. The air is supplied by any suitable air compressing machine, such as a blower 28, from which the pipe 25 extends to the tank 19. The blower draws the air through an air filter 28A.

The hot air that forms the percolating jets may be heated before it enters the blower or after it leaves the blower, or it may be heated in the course of its compression, to the desired degree, if an air compressor is used, but we preferably heat the air by inserting within the pipe 25 that conveys the air from the blower to the tank 19, a steam coil 29, which is connected to the steam boiler 4 by a pipe 30. An exhaust pipe 31, is also extended from the coil. The air then passes through the steam-heated coil as it flows through the pipe, and is heated to the desired degree of heat, which is regulated at the boiler. This hot air flowing into this sized charge of butter oil under this pressure and in such a great volume per minute, percolates through the butter oil with such a constant steady force that it keeps the butter oil in an intensely forcible bubbling action. The heat and force action of so many thousands of needle-like jets of air, force up through the butter oil and carry with them any deleterious, impure, and foreign elements and substances there may be in the butter oil, and they destroy, eradicate, eliminate, and drive out the germ and fungus matter, also the greater portion of the moisture, and after from about a two to five hour hot air percolating and aerating and refining treatment the butter oil is reduced to a practically pure dry butter oil. The hot air is then shut off, and the butter oil is then removed from this hot air aerating treatment tank, and is conveyed to an emulsifying treatment tank, where it is mixed with properly pasteurized and prepared milk, or if desired with cream, or butter milk, or with sour milk, but preferably with pure fresh properly prepared milk, from which air or oxygen, either hot or cold or in any form, is excluded, as its presence under pressure in the butter oil and milk in a measure drives out from the milk and butter oil the bouquet or sweet tasting flavor of the milk, which is the essential element we wish to impart to the butter oil by the emulsifying treatment. These innumerable hot jets of air flow with sufficient pressure up through the butter oil to separate from it and carry up through it to its surface and into the space in the tank above it, any impure, foreign, and deleterious matter therein, and this impure, foreign, and deleterious matter is removed from the surface and from above the surface of the butter oil, and from the tank by a suction air blast that is strong enough and has capacity to draw from the tank the discharge of the thousand to twelve hundred feet of hot percolating air jets per minute, and carry all of this matter with it. This suction air blast may be operatively connected to the charge of butter oil by any of the commonly used air suction devices, such as a suction blower or fan 32, and suitable piping 32A, leading from above the surface of the butter oil and connected to the receptacle tank or vessel in which it is confined to the atmosphere. In the practical application and operation of this feature of our invention, however, we attach a large funnel shaped pipe 33, to the central portion of the top of the tank, which extends to the atmosphere. A drip trap 34, which is provided with a plugged discharge aperture, is formed in the pipe to catch the oil carried into the lower end of the pipe by the suction air blast, and in the pipe the suction fan 32, is placed, which is operatively connected to an electric motor 35, or other source of power, which is of capacity enough to suck the volume of percolating air and the freed and separated impurities from the butter oil and tank.

The purified and refined butter oil, when it is run into a mixing emulsifier, is very thoroughly stirred, kneaded, agitated, washed, and mixed with properly pasteurized or otherwise prepared milk, cream, buttermilk, or sour milk, until it is fully and thoroughly emulsified. This emulsifying step in our process may be carried out in any positively acting, mechanical stirring emulsifying machine, but in the practical operation of our process we have found it necessary to provide a mechanical and positively operating milk and butter-stirring, kneading, and mixing and emulsifying device 36, as we do not treat the refined butter oil to an air blast either hot or cold in the presence of milk or in the presence of sour milk or in the presence of butter-milk, or in the presence of cream, or in the presence of any other material, and we do not use air either hot or cold in the form of percolating jets in the emulsifying treatment, but we confine this treating of the refined butter oil and milk to a mechanical mixing of the butter oil and the milk until the butter is properly emulsified by and with the milk. This emulsifying device comprises a tank 37, having a conical bottom, in which a valve discharge aperture and pipe 38, is placed, and which is surrounded by an outside tank 39, that forms a steam or water jacketed space 40, around the tank, which is provided with a valve water inlet pipe 41; in the axial center of this tank we rotatably mount a vertical shaft 42, that is provided at its upper end with a driving pulley 43, that is adapted to be connected by a belt to a source of power, such as an electric motor 44. On this shaft at the lower portion of this tank, we secure a screw-bladed propeller 45, and at a short distance above the propeller and in the lower portion of the tank we form a partition floor or diaphragm 46, across the tank, in which a plurality of apertures 47 are formed, for the butter oil to flow through: around each of the apertures 47 on the upper side of the floor we form an angular baffle plate 48, which are all adapted to deflect the jets of butter oil and milk from vertical and other channeling paths. The water or steam jacket space is connected by a valve pipe 49, with the boiler 4, and this space is filled with water which is heated and kept hot by steam from the boiler 4. The renovated and refined butter oil is then run into the emulsifier, and a suitable supply of properly prepared milk is also run into the emulsifier from a supply tank 50, until the emulsifier contains a fixed charge, and we preferably make this emulsifying machine to receive the full charge of the melter and curd separator, and of the air percolating tank, which as above stated is about twelve to fifteen hundred pounds. After the emulsifier has been filled up, the screw propeller is rotated preferably at a speed of from about one hundred and fifty to two hundred revolutions per minute.

Our mechanical emulsifier treatment of butter oil differs from all others, in the fact that we do not treat the butter oil to an air blast in the presence of milk, or to an innumerable number of divided and independent air percolating needle-like jets, and in fact do not in any manner treat the butter oil with air in any form in the presence of milk, our treatment being purely a mechanical commingling and mixing process of the butter and the milk, which is effected by rapidly revolving the screw propeller, which forces the butter oil and milk up through the apertures in the floor across the tank, which jets are projected in different directions up through the mass of butter oil and milk, while at the same time the butter oil and milk are steadily flowing down to the bottom of the tank; consequently the butter oil and the milk are kept in a constant and continuous endless movement through the central and other apertures of the diaphragm across the tank until it is thoroughly mixed to a butter-oil milk fluid, and with not too great an agitation to prevent a thorough emulsification of the butter oil and milk, which mixing imparts to the butter oil a good pure butter taste. This butter oil mixing treatment is continued for a period of time of from about 10 to 30 minutes, as the emulsification is very rapid. As soon as this mechanical mixing emulsifying treatment is complete, the emulsified butter oil is run into a cooling and congealing tank 51, which comprises a tank in which a body of clear pure cold or ice water is placed, into which the charge of emulsified butter oil is run, and this cold water congeals the emulsified butter oil into butter crystals, which are separated from the water and are conveyed to a reworking tank 52, which is a tank provided with rotating paddles or blades, that are rotatably connected to a source of power, such as a motor 53, where it is reworked to a commercially salable and consumable condition.

Our process is very simple. It is practically automatic and continuous in its operation, and it will renovate and refine old butter, and will improve in purity new creamery butter, in a very much less time and with very much less expense than the processes at present in use; and while we have described the preferred method of carrying our process into operation, and the preferred apparatus we employ in practically operating our process, we do not wish to be limited to the exact method of carrying out the several steps of our process, or to any particular type or character of apparatus, as many changes might be made without departing from the spirit of our invention.

Having described our process, what we claim as new and desire to secure by Letters Patent, is:

A process for renovating butter, which consists of first melting and separating the curds from the butter and of keeping said butter oil in a melted condition, then confining a shallow quantity of said melted butter oil in a shallow mass in a melted state, and free from contact with milk or any other emulsifying fluid, and from water, and treating said melted butter oil to innumerable jets of hot air under pressure enough to keep said quantity of melted butter oil in an agitated condition, and until the impurities have been driven out of it, then removing said impurities by air suction, then keeping said butter oil in a heated condition but free from the presence of air under pressure, and mixing it with properly prepared milk or cream or butter-milk or sour milk until it has become an emulsified butter oil, then cooling and congealing said emulsified butter oil, and then reworking said congealed, emulsified, and purified butter oil to a perfected commercial and consumable state.

In testimony whereof we affix our signatures in presence of two witnesses.

CHARLES C. MARTIN.
WILLIAM D. JONES.

Witnesses:
G. SARGENT ELLIOTT,
ADELLA M. FOWLE.